United States Patent
Kumar et al.

(10) Patent No.: US 10,460,307 B2
(45) Date of Patent: Oct. 29, 2019

(54) METHODS AND DEVICES FOR FRAUD DETECTION BASED ON ROAMING STATUS

(71) Applicant: Rogers Communications Inc., Toronto (CA)

(72) Inventors: Vinay Kumar, Brampton (CA); Jeppe Dorff Ramlau-Hansen, Toronto (DK)

(73) Assignee: Rogers Communications Inc., Toronto, Ontario (CA)

(*) Notice: Subject to any disclaimer, the term of this patent is extended or adjusted under 35 U.S.C. 154(b) by 629 days.

(21) Appl. No.: 13/798,276

(22) Filed: Mar. 13, 2013

(65) Prior Publication Data

US 2014/0279501 A1    Sep. 18, 2014

(51) Int. Cl.
G06Q 20/32    (2012.01)

(52) U.S. Cl.
CPC .................. G06Q 20/3224 (2013.01)

(58) Field of Classification Search
CPC ......... G06F 11/00; G06F 21/00; G07C 13/00; G16H 10/00; G16H 15/00; G16H 20/00; G16H 30/00; G16H 40/00; G16H 50/00; G16H 70/00; G16H 80/00; G16H 10/40; G16H 20/10; G16H 20/13; G16H 20/17
USPC ............... 705/12, 50, 901, 2, 3, 15
See application file for complete search history.

(56) References Cited

U.S. PATENT DOCUMENTS

| | | |
|---|---|---|
| 6,757,722 B2 | 6/2004 | Lonnfors et al. |
| 8,145,561 B1 | 3/2012 | Zhu |
| 2002/0052754 A1* | 5/2002 | Joyce ............... G06Q 20/00 455/407 |
| 2003/0018704 A1 | 1/2003 | Polychronidis et al. |
| 2005/0266859 A1* | 12/2005 | Tejani ............. H04W 60/00 455/456.4 |
| 2008/0209213 A1 | 8/2008 | Astrand et al. |
| 2009/0227239 A1 | 9/2009 | Heen |
| 2011/0282789 A1 | 11/2011 | Carroll et al. |
| 2012/0196568 A1* | 8/2012 | Bakshi ............. G06Q 20/40 455/411 |

OTHER PUBLICATIONS

EPO, Extended European Search Report relating to Application No. 14159213.9, dated Jul. 9, 2014.

(Continued)

*Primary Examiner* — Robert W Morgan
*Assistant Examiner* — Charles P Coleman
(74) *Attorney, Agent, or Firm* — Roward LLP

(57) ABSTRACT

Methods, devices and servers for assisting in financial transaction fraud detection are described. In one aspect, a method for notifying of a roaming status of an electronic device is described. The method is implemented by a wireless service provider server associated with a wireless service provider. The electronic device is associated with a subscription service package of the wireless service provider. The method includes: detecting a roaming condition associated with the electronic device; and after detecting the roaming condition, retrieving financial institution information associated with the electronic device, the financial institution information identifying a financial institution, and sending a notification of the roaming status of the electronic device to a financial institution server associated with the identified financial institution.

19 Claims, 4 Drawing Sheets

(56) References Cited

OTHER PUBLICATIONS

Perez, Sara, "Beyond the Check-in: How Location Services Can Now Fight Identity Theft", ReadWriteMobile, Oct. 12, 2010, pp. 1-8, http://readwrite.com/2010/10/12/beyond-the-check-in-how-location-services-fight-identity-theft, retrieved Nov. 21, 2012.

Kim, Ryan, "Can BankSimple Live Up to Its Name?", GigaOM, Feb. 11, 2011, pp. 1-12, http://gigaom.com/2011/02/11/can-banksimple-live-up-to-its-name/, retrieved Nov. 21, 2012.

PinPoint, "Protect Your Credit and Debit Cards with PinPoint", PinPoint Homepage, p. 1, http://www.pinpoint-fraud.com/, retrieved Nov. 21, 2012.

TRANSACTIONAGE, "Mobile Phones to Be Used in Fraud War", TRANSACTIONAGE, Mar. 1, 2011, p. 1-2, http://www.transactionage.com/2011/03/01/mobile-phones-to-be-used-in-fraud-war/, retrieved Nov. 21, 2012.

Kim, Ryan, "Phones Becoming Frontline in Credit Card Fraud Battle", GigaOM, Feb. 17, 2011, pp. 1-11, http://gigaom.com/2011/02/17/phones-becoming-frontline-in-credit-card-fraud-battle/, retrieved Nov. 21, 2012.

Perez, Sara, "Visa Europe to Use Mobile Phones' Location to Prevent Fraud", ReadWriteMobile, Dec. 3, 2010, pp. 1-8, retrieved Nov. 21, 2012.

MBNA, "When You're Going Abroad . . . " UK MBNA Official Sites, http://www.mbna.co.uk/card-services-benefits/travel/, retrieved Jan. 8, 2013.

CIPO, CA Office Action relating to Application No. 2,845,264, dated Jun. 3, 2015.

CIPO, CA Office Action relating to CA application No. 2,845,264, dated May 15, 2017.

* cited by examiner

METHODS AND DEVICES FOR FRAUD DETECTION BASED ON ROAMING STATUS

TECHNICAL FIELD

The present disclosure relates generally to systems for preventing fraudulent use of a service. More specifically, it relates to methods and devices for assisting a financial institution server in identifying fraudulent use of a financial service.

BACKGROUND

Financial institutions such as banks, issue various forms of financial instruments to customers in order to allow them to conduct financial transactions. For example, a financial institution may issue a credit card and/or a debit card to a customer enabling the customer to make purchases. Unfortunately, credit cards and debit cards may be easily stolen, misplaced, lost, or a credit card number may be captured fraudulently and used to attempt to perform an unauthorized transaction. To safeguard against fraudulent misuse of credit cards and debit cards, financial institutions have adopted various security protocols.

Financial institutions sometimes consider whether a financial transaction is being originated in an unexpected location; for example, in a country that is different than a customer's home country. If the location of processing is unexpected, the financial institution may trigger further inspection of that transaction prior to approving it or prevent the financial transaction from occurring.

This location-based validation procedure may help to prevent fraud, but also sometimes causes a financial transaction to be erroneously declined. For example, when a user has travelled to a new location and the user has not informed the financial institution of the travel, a transaction may be erroneously declined.

BRIEF DESCRIPTION OF THE DRAWINGS

Reference will now be made, by way of example, to the accompanying drawings which show an embodiment of the present application, and in which.

Similar reference numerals are used in different figures to denote similar components.

DETAILED DESCRIPTION OF EXAMPLE EMBODIMENTS

Figure 1:
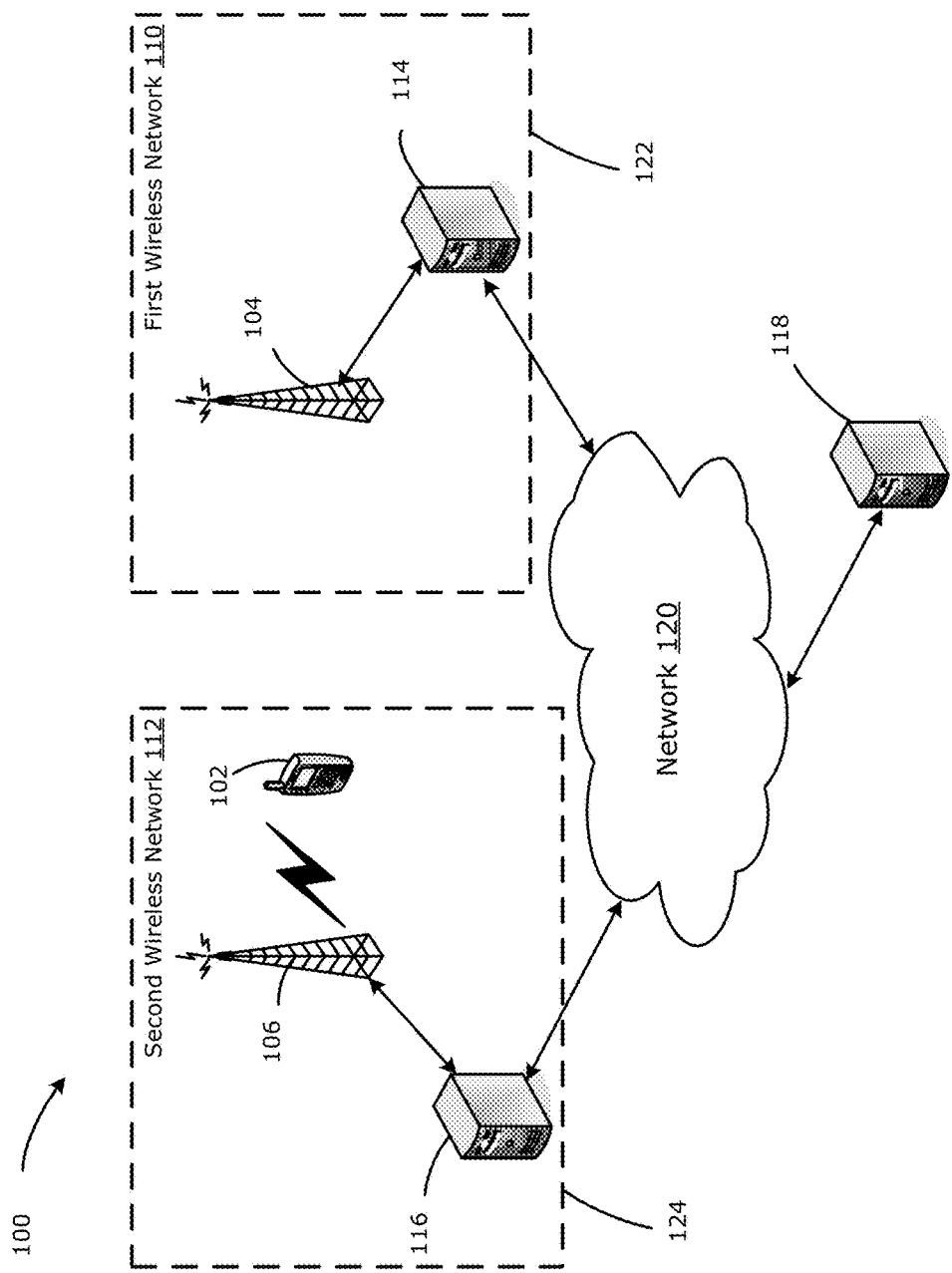
FIG. 1 shows a block diagram illustrating an example communication system in which example embodiments of the present disclosure may operate.

In one aspect, a method for notifying of a roaming status of an electronic device is described. The method is implemented by a wireless service provider server associated with a wireless service provider. The electronic device is associated with a subscription service package of the wireless service provider. The method includes: detecting a roaming condition associated with the electronic device; and after detecting the roaming condition, retrieving financial institution information associated with the electronic device, the financial institution information identifying a financial institution, and sending a notification of the roaming status of the electronic device to a financial institution server associated with the identified financial institution.

In yet another aspect, a wireless service provider server associated with a wireless service provider is provided. The wireless service provider provides a subscription service package to an electronic device. The wireless service provider server includes a communication subsystem and a memory. The wireless service provider server also includes a processor coupled to the communication subsystem and the memory. The processor is configured to: detect a roaming condition associated with the electronic device; and after detecting the roaming condition, retrieve financial institution information associated with the electronic device, the financial institution information identifying a financial institution, and send a notification of the roaming status of the electronic device to a financial institution server associated with the identified financial institution.

In yet another aspect, a method for notifying of a roaming status of an electronic device is described. The method is implemented by the electronic device. The electronic device is associated with a subscription service package of a wireless service provider. The method includes: receiving a request from a wireless service provider server associated with the wireless service provider to authorize notifying a financial institution server of a financial institution associated with the electronic device of the roaming status of the electronic device; in response to receiving the request, presenting a prompt requesting confirmation to authorize the wireless service provider to notify the roaming status of the electronic device to the financial institution server; and if confirmation is received, sending authorization to the wireless service provider server to notify the financial institution server of the roaming status of the electronic device.

In yet another aspect, an electronic device is described. The electronic device includes a processor. The processor is configured for: receiving a request from a wireless service provider server associated with the wireless service provider to authorize notifying a financial institution server of a financial institution associated with the electronic device of the roaming status of the electronic device; in response to receiving the request, presenting a prompt requesting confirmation to authorize the wireless service provider to notify the roaming status of the electronic device to the financial institution server; and if confirmation is received, sending authorization to the wireless service provider server to notify the financial institution server of the roaming status of the electronic device.

In yet another aspect, a non-transitory computer readable medium is described. The non-transitory computer readable medium includes instructions for performing a method described herein.

Other aspects and features of the present application will become apparent to those ordinarily skilled in the art upon review of the following description of specific embodiments of the application in conjunction with the accompanying figures.

Example Communication System

Reference is first made to FIG. 1, which illustrates in block diagram form a communication system 100 in which example embodiments of the present disclosure may operate.

In the embodiment of FIG. 1, an electronic device 102 is illustrated. More specifically, the electronic device 102 is a mobile communication device, such as a smartphone or tablet. The electronic device 102 may be capable of data communications, voice communications, or both voice and data communications. The mobile communication device may communicate with other electronic devices, servers and/or systems connected with the communication system 100. For example, in some embodiments, a mobile communication device may connect, via the communication system 100, to a telephone (which may be another mobile communication device or a telephone of another type) to allow a user of the mobile communication device to engage in a voice-based communication with another user.

Accordingly, in at least some example embodiments, the electronic device 102 is connected for communication via one or more wireless networks which may include Wireless Wide Area Networks (WWAN), Wireless Local Area Networks (WLAN), other network arrangements, and/or a combination of these networks. A WWAN is commonly referred to as a "cellular network", and may include a number of transceiver base stations 104, 106 (with two being shown in FIG. 1). Each of the transceiver base stations 104, 106 provides wireless radio frequency coverage for a corresponding area or cell, in order to facilitate wireless communication for the electronic device 102.

A WWAN may be operated by one or more wireless service providers that provide the communication services necessary for the electronic device 102 to connect to the WWAN. The WWAN may conform to various network types (such as, GSM, GPRS, LTE, TDMA, CDMA, etc.), and may support a number of frequency bands for communications within a particular wireless network type (for example, in the GSM network, the transceiver base station may support four frequency bands: 850/900/1800/1900 MHz). The WWAN via a transceiver base station provides a number of channels within a frequency band to allow the electronic device 102 to communicate. That is, the transceiver base station assigns an available channel to the electronic device 102 to establish a communication link within the WWAN.

In the illustrated example of FIG. 1, two WWANs are shown in the form of a first wireless network 110 and a second wireless network 112. The first wireless network 110 is operated by a first wireless service provider, and includes at least a first transceiver base station 104 and a first wireless service provider server 114. While, the second wireless network 112 is operated by a second wireless service provider, and includes at least a second transceiver base station 106 and a second wireless service provider server 116. Accordingly, the electronic device 102 may be connected to either of wireless networks and roam between these wireless networks.

Within a wireless network, a transceiver base station is connected to a wireless service provider server (for example, in FIG. 1 the first transceiver base station 104 is connected to the first wireless service provider server 114, and the second transceiver base station 106 is connected to the second wireless service provider server 116). A wireless service provider server is operated by a wireless service provider and may provide specific functions and features for the wireless service provider. A wireless service provider is a provider of communication services to the electronic device 102, and may be referred to as a mobile network operator (MNO). The wireless service provider may own or control all the elements necessary to sell and deliver communication services to the electronic device 102. For example, the wireless service provider may own or control the wireless network infrastructure (which includes the transceiver base stations and the wireless service provider servicers), back haul infrastructure, provisioning, billing and customer care computer systems, marketing, engineering and repair organizations, etc. These elements are required in delivering and managing wireless communication services to end-users of electronic devices 102. Examples of wireless service providers include Rogers Wireless™, Telus Mobility™, Verizon Wireless™, AT&T Mobility™, etc.

It will be appreciated that some of the functions of the "wireless service provider server" may, in some embodiments, be provided on a server that is not owned or operated by the wireless service provider. For example, in at least some embodiments, a third party may operate a server that is configured to perform some or all functions of the wireless service provider server discussed herein. For example, in some embodiments, a Mobile Virtual Network Operator (MVNO) may own and/or operate some components of a wireless network such as, for example, a server that is configured to perform some or all of the functions of the wireless service provider server described in this document. Wireless access may be a subscription-based service. That is, in order for the electronic device 102 to obtain communication services, the electronic device 102 may need to subscribe to a wireless service provider. Such subscription services may be pre-paid (which is commonly referred to as "pay as you go") or may be post-paid subscription services. The wireless service provider provides subscription services in the form of a subscription service package that is purchased by end-users of the electronic devices 102 in order to enable the electronic devices 102 for communication on the wireless networks. The subscription services provided by a wireless service provider may include voice communication services (such as, daytime calling, weeknight, weekend and holiday calling, long-distance calling, international calling, etc.), data communication services (such as access to the Internet, SMS, MMS, email, etc.) and communication service features (such as, voice call, caller ID, conference call, call waiting, roaming usage, etc.). The subscription service package defines the terms of usage of the subscription services such as amount of voice and data communications, number and type of voice and data communications, rates of voice and data communications, etc.

A purchased subscription service package is typically associated with a subscriber identity module (SIM) provided by a wireless service provider. The SIM may be referred to as a "virtual SIM" (i.e. a software module or application) for storage on a physical element referred to as a "SIM card" (which may also be referred to as a universal integrated circuit card (UICC)), that is integrated within the electronic device 102.

When an end-user purchases a subscription service package from a wireless service provider, the end-user is subscribed to the wireless service provider. In such example embodiments, the subscription service package typically defines a home network for the electronic device 102 that is associated with the subscription service package. The home network is operated by the wireless service provider providing the subscription service package. The home network may define a coverage area 122, 124 that includes a specific geographic region (i.e. the region of coverage by a wireless network). For example, the home network may define a city, a state/province or a country. In such cases, the subscription service package may provide favourable rates of usage for communication services when the electronic device 102 is connected to the home network (i.e. it is within the coverage area of the home network).

In at least some example embodiments, the subscription service package provides roaming capabilities for the electronic device 102. Roaming refers to the extension of communication services in a location that is different from the home network or location where the electronic device 102 is registered. Roaming ensures that the electronic device 102 is maintained connected to a wireless network (i.e. it is connected to a visiting network which may or may not be operated by the wireless service provider that provides the subscription service package for the electronic device 102) when the electronic device 102 is outside the coverage area of the home network. Electronic devices 102 that are roaming are often charged premium rates for voice and data communication usage. That is, a roaming policy rate define by the subscription service package is applied for usage of the electronic device 102 when the electronic device 102 is roaming.

As the electronic device 102 is moved, the roaming conditions associated with that electronic device 102 may change. A roaming condition, which may also be referred to as a roaming status, may define whether the electronic device 102 is currently roaming and/or the type of roaming involved. For example, a roaming condition may define whether the electronic device 102 is regionally roaming, nationally roaming and/or internationally roaming.

Regional roaming may refer to a roaming condition that exists when the electronic device 102 moves from a home network to a visiting network. Both the home network and the visiting network may be operated by the same wireless service provider. That is, they may both be operated by the wireless service provider providing the subscription services for the electronic device 102. In some scenarios, however, the home network may be restricted to a specific geographic area and, once the electronic device leaves that geographic area, it may be considered to be roaming, even if it is communicating with a wireless network that is operated by the same service provider as the home network. For example, when the electronic device moves to an area which is serviced by the wireless service provider associated with that device but which is outside of a home-zone associated with the subscription service for that device (e.g. the home-zone may be a region where favorable billing rates apply and the area to which the device moves may be an area where less-favorable billing rates apply) then it may be considered to be regionally roaming.

National roaming may refer to a roaming condition that exists when the electronic device 102 moves from a home network operated by the wireless service provider providing the subscription services, to a visiting network operated by a different wireless service provider that provides coverage in a different region within the same country (i.e. the electronic device 102 is moved within the country).

International roaming refers to a roaming condition that exists when the electronic device 102 moves from a home network operated by the wireless service provider providing the subscription services to a visiting network operated by a different and foreign wireless service provider that provides coverage within a different country (i.e. the electronic device 102 is moved across countries).

In the example of FIG. 1, two wireless networks 110, 112 are illustrated. One of these wireless networks 110, 112 may act as a user's home network and one of the wireless networks may act as a visiting network. Each of the wireless networks 110, 112 has a corresponding coverage area 122, 124. The first wireless network 110 has a first coverage area 122 and the second wireless network 112 has a second coverage area 124. The coverage area 122, 124 of a wireless network 110, 112 describes the geographic locations where an electronic device 102 may communicate via that wireless network 110, 112. An electronic device 102 operating in the first coverage area 122 may communicate with the first wireless network 110 and an electronic device 102 operating in the second coverage area 122 may communicate with the second wireless network 112. In the example illustrated, the electronic device 102 is located within the coverage area 124 of the second wireless network 112. However, it will be appreciated that the electronic device 102 may, in some embodiments, be located in the coverage area 122 of the first wireless network 110.

In some embodiments, the coverage area 122, 124 of the first wireless network 110 and the second wireless network 112 may overlap in part. That is, an electronic device 102 may, in some locations, communicate with both the first wireless network 110 and the second wireless network 112. However, at least some of the coverage area 122, 124 of the two wireless networks 110, 112 is different. That is, an electronic device 102 may operate in at least one location in which it may communicate with one of the wireless networks 110, 112 but not both.

In some embodiments, the first wireless network 110 and the second wireless network 112 have coverage areas 122, 124 that do not overlap. For example, in some embodiments, the first wireless network 110 and the second wireless network 112 service different countries. As noted previously, an electronic device 102 may be associated with a specific wireless network 110, 112 to which that electronic device 102 subscribes but may move out of the coverage area of that wireless network and into the coverage area of another wireless network to which the electronic device does not directly subscribe. For example, the electronic device 102 may be associated with the first wireless network 110 but may leave the coverage area 122 provided by the first wireless network 110 and may move into the coverage area 124 provided by a second wireless network 112. In this location, the electronic device 102 may communicate via the second wireless network 112. When the electronic device moves to a location outside of its home location where its service was registered, the electronic device may be said to be roaming in at least some embodiments.

In order to maintain connectivity of the electronic device 102 across different networks operated by different wireless service providers, the wireless service providers may have roaming agreements with one another. That is, the wireless service providers may agree to roaming agreements to allow electronic devices 102 registered with either of the wireless service providers to operate on each other's wireless networks. Otherwise, if no roaming agreement exists between the wireless service providers, the electronic devices 102 registered with either of the wireless service providers may not operate on each other's wireless networks. Accordingly, the electronic device 102 may lose communication services when the electronic device 102 is outside of its home network operated by a wireless service provider, and within the coverage of a wireless network operated by a different wireless service provider.

It will be appreciated that in at least some example embodiments, the subscription service package of the electronic device 102 may not authorize roaming of the electronic device 102, even though the wireless service provider may provide roaming capabilities. In such cases, an end-user may decline to include roaming capabilities for the electronic device 102 when purchasing the subscription service package.

In at least some example embodiments, in order for the electronic device 102 to roam and maintain connection with the visiting network, the foreign wireless service provider operating the visiting network initially identifies the electronic device 102 when the electronic device 102 enters the visiting network (e.g. when it moves within the coverage area of the visiting network). The electronic device 102 may enter the visiting network either by being powered-on within the visiting network or being transferred from the home network to the visiting network via a handover. When identifying the electronic device 102, the foreign wireless service provider determines that that the electronic device 102 is not registered as a direct subscriber of the visiting network. During this identification process, the foreign wireless service provider may obtain identifying information from the electronic device 102. The identifying information may include home network information and/or a unique identifier (such as, an international mobile subscriber identity (IMSI)) for the electronic device 102. The foreign wireless service provider uses this information to determine if a roaming agreement exists between itself and the home network service provider. If a roaming agreement exists, the foreign wireless service provider may then contact the home wireless service provider and obtain subscription service information for the electronic device 102. For example, the subscription service information may define whether the home wireless service provider allows roaming services for the electronic device 102. If roaming is allowed, the electronic device 102 is connected with the visiting network and the foreign wireless service provider maintains a temporary subscriber record for the electronic device 102. Additionally, the home wireless service provider may update information related to the electronic device 102 to indicate that the electronic device 102 is on the visiting network. For example, the home wireless service provider may store information defining the roaming condition of the electronic device 102. For example, the home wireless service provider may store (in memory associated with a system provided by the home wireless service provider) an indication that the electronic device 102 is roaming and/or may store information about the type of such roaming (e.g. whether the roaming is regional, national, international, etc.). In at least some embodiments, the home wireless service provider may store information specifying the location of the electronic device 102. For example, the home wireless service provider may identify and store the location associated with the visiting network (such as the country in which the visiting network is located, and/or a specific visitor location register (VLR) that is hosting the electronic device providing further granular location). This information may be utilized by the home wireless service provider for various functions and features as will be described below.

In the illustrated example of FIG. 1, the electronic device 102 is associated with a subscription service package of the first wireless service provider. Accordingly, the first wireless network 110 provided by the first wireless service provider defines a home network for the electronic device 102. The second wireless network 112 provided by the second wireless service provider defines a visiting network which the electronic device 102 may roam in and maintain communication services by being connected to the second wireless network 112.

In order to allow for the roaming procedure described above to be implemented, the home wireless network (such as the first wireless network 110) and the visiting wireless network (such as the second wireless network 112) are communicably connected to one another to allow components of these networks to exchange information. In the example illustrated in FIG. 1, the first wireless network 110 and the second wireless network 112 are connected via a network 120. More particularly, wireless service provider servers associated with each wireless network (i.e. the first wireless service provider server 114 (which may be associated with the home network) and the second wireless service provider server 116 (which may be associated with the visitor network)) connect to one another via the network 120. The network 120 may be a public network or a private network, or a combination thereof, and may include the internet.

The communication system 100 also includes a financial institution server 118 that is operated by a financial institution (such as, a bank). The financial institution may provide financial instruments (such as credit cards, debit cards, checks, etc.) to an end-user of the electronic device 102. Accordingly, in at least some example embodiments, the financial institution server 118 may manage the financial instruments for financial transactions. For example, the financial institution server 118 may manage security features of the financial instruments by declining certain financial transactions. For example, the financial institution server 118 may decline a financial transaction utilizing the financial instrument if the financial transaction occurs in an unexpected location such as a country different than the home country of the end-user of the financial instrument.

In at least some example embodiments, the financial institution server 118 may manage mobile payments from the electronic device 102. For example, the electronic device 102 may store financial instrument information (such as credit card information) and security key information on the SIM card or in a separate area of the electronic device (such, as a storage area or a secure exchange manager). An end-user making a purchase, may communicate with a point of sale (POS) terminal of a merchant via a short range communication subsystem of the electronic device 102 to provide financial instrument information to a back-end server connected to the POS terminal. The back-end server which may be operated by the merchant or a third-party may communicate with the financial institution server 118 to obtain payment for the purchase by the end-user.

In at least some example embodiments, the financial institution server 118 may be notified by the home wireless service provider (i.e. the first wireless service provider server 114) of a roaming status of the electronic device 102. Accordingly, the financial institution server 118 may update information associated with the end-user of the electronic device 102 after being notified of the roaming status and may use the roaming status of the electronic device 102 in order to determine whether to authorize a financial transaction. For example, the financial institution server may allow financial transactions to be completed if they are originated at a POS terminal that is located within the region that the electronic device 102 is roaming or that is near such a region. If the location of the POS terminal does not correspond closely enough with the location in which the electronic device is roaming, the financial institution server 118 may decline financial transactions as a security feature to prevent identity theft. In such example embodiments, for example, the first wireless service provider server 114 (which is operated by the first wireless service provider that provides the first wireless network 110 defined as the home network) may detect a roaming condition associated with the electronic device 102 (in at least some example embodiments, the roaming condition may be limited to one or more types of roaming, such as only international roaming). For example, the electronic device 102 may be moved and connected to the second wireless network 112 (defined as the visiting network) provided by the second wireless service provider.

In at least some example embodiments, the second wireless service provider server 116 may communicate with the first wireless service provider server 114 to allow the electronic device 102 to roam when the electronic device 102 enters the second wireless network 112; and accordingly, the first wireless service provider server 114 may detect that the electronic device 102 is roaming (and may detect the type of roaming and/or the location of the roaming) After detecting the roaming condition, the first wireless service provider server 114 may retrieve financial institution information associated with the electronic device 102 (the financial institution information may be stored on the first wireless service provider server 114 or another device, system and/or server). The retrieved financial institution information identifies a financial institution associated with the electronic device 102 (e.g. a financial institution associated with the electronic device's user, who is a subscriber to the first wireless network 110). The first wireless service provider server 114 then sends a notification of the roaming status of the electronic device 102 to the financial institution server 118 associated with the financial institution.

In at least some example embodiments, the first wireless service provider server 114 automatically sends the notification to the financial institution server 118 after detecting that the electronic device 102 is roaming. However, in at least some example embodiments, further verification is required prior to sending the notification. For example, in at least some example embodiments, the first wireless service provider server 114 may send a request to the electronic device 102 for authorization to notify the financial institution server 118 of the roaming status of the electronic device 102. Then, after receiving from the electronic device 102 authorization to notify the financial institution server 118 (for example, the end-user may input an authorizing instruction via an input interface associated with the electronic device 102) of the roaming status of the electronic device 102, the notification is sent to the financial institution server 118 from the first wireless service provider server 114.

In at least some example embodiments, the first wireless service provider server 114, may determine whether subscription preferences associated with the electronic device 102 authorize notifying the financial institution server 118 of the roaming status of the electronic device 102. Such preferences may be consulted instead of or in addition to sending the request to the electronic device for authorization to release the roaming status. If it is determined that the subscription preferences associated with the electronic device 102 authorize notifying the financial institution server 118, the notification is sent to the financial institution server from the first wireless service provider server 114.

In at least some example embodiments, the first wireless service provider server 114 may later detect that the electronic device 102 is not roaming after detecting the roaming condition. That is, the electronic device 102 may return to the home network from the visiting network (for example, from the second wireless network 112 to the first wireless network 110). In response to detecting that the electronic device 102 is not roaming, the first wireless service provider server 114 may send another notification to the financial institution server 118 now indicating that the electronic device 102 is not roaming.

Example components and features of a wireless service provider server, and more particularly a first wireless service provider server 114 will be discussed in greater detail below with reference to FIG. 2.

It will also be appreciated that the above-described communication system 100 is provided for the purpose of illustration only, and that the above-described communication system 100 includes one possible communication network configuration of a multitude of possible configurations.

Example Wireless Service Provider Server

Figure 2:
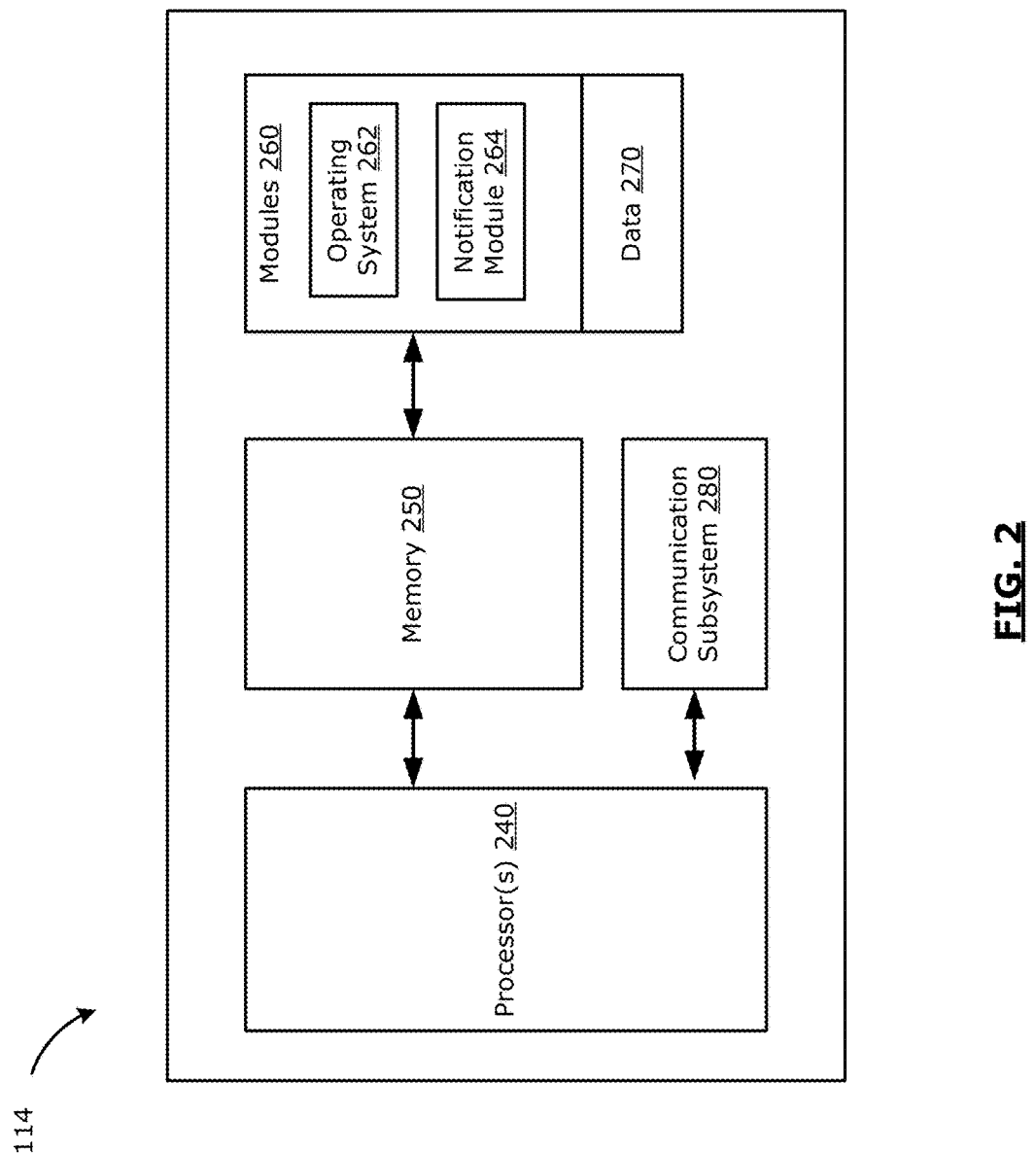
FIG. 2 shows a block diagram of an example wireless service provider server in accordance with example embodiments of the present disclosure.

Reference is next made to FIG. 2 which illustrates an example wireless service provider server in block diagram form. More specifically, the first wireless service provider server 114 is illustrated. Although the first wireless service provider server 114 is shown to be implemented as a single server, it will be understood that the functions of the first wireless service provider server 114 may be implemented across a multitude of network servers, or other suitable architecture.

In at least some embodiments, the functions of the first wireless service provider server 114 may be implemented, in whole or in part, by way of a processor 240 which is configured to execute software modules 260 stored in memory 250. In the embodiment of FIG. 2, the first wireless service provider server 114 includes a controller comprising one or more processors 240 which control the overall operation of the first wireless service provider server 114. The processor 240 interacts with one or more communication subsystems 280 to perform communication functions via the first wireless network 110, the second wireless network 112 and/or the network 120, with other systems, servers and/or devices such as the electronic device 102 and the financial institution server 118.

The first wireless service provider server 114 also includes memory 250 which is connected to the processor 240 for receiving and sending data to the processor 240. While the memory 250 is illustrated as a single component, it will typically be comprised of multiple memory components of various types. For example, the memory 250 may include Random Access Memory (RAM), Read Only Memory (ROM), a Hard Disk Drive (HDD), Flash Memory, or other types of memory. It will be appreciated that each of the various memory types will be best suited for different purposes and applications.

The processor 240 may operate under stored program control and may execute software modules 260 stored on the memory 250. The software modules 260 may be comprised of, for example, operating system software 262, and one or more additional modules such as a notification module 264 to carry out specific functions of the first wireless service provider server 114.

For example, in at least some example embodiments, the notification module 264 may detect a roaming condition associated with the electronic device 102. In such example embodiments, the electronic device 102 is registered with the first wireless service provider that is associated with the first wireless service provider server 114. That is, the end-user of the electronic device 102 purchases a subscription service package for the electronic device 102 from the first wireless service provider to enable communication functionalities on the electronic device 102. Additionally, the subscription service package may define a home network for the electronic device 102 (which may be the first wireless network 110 provided by the first wireless service provider).

Accordingly, when the electronic device 102 leaves the home network and enters another network, the notification module 264 may detect a roaming condition associated with the electronic device 102. In at least some example embodiments, the roaming condition may be configured so that it is detected in response to a particular type of roaming such as an international roaming. That is, the notification module 264 may detect a roaming condition only when the electronic device 102 enters a network in another country provided by a foreign wireless service provider (i.e. it is internationally roaming). In such example embodiments, the notification module 264 may detect the roaming condition when a foreign wireless service provider server associated with the foreign wireless service provider communicates with the first wireless service provider server 114 in attempting to allow roaming connection of the electronic device 102 when the electronic device 102 enters the foreign wireless service provider's network.

After detecting a roaming condition associated with the electronic device 102, the notification module 264 retrieves financial institution information associated with the electronic device 102. The financial institution information identifies a financial institution. More particularly, in at least some embodiments, the identifying information identifies a location associated with the financial institution server 118 (such as an IP address associated with the financial institution server 118). For example, the financial institution information associated with the electronic device 102 may be stored in the data area 270 of the memory 250, and the notification module 264 retrieves this financial institution information from the data area 270 of the memory 250. The financial institution information may be arranged in data stores within the data area 270 of the memory 250, with each data store storing the financial institution information of an associated electronic device 102. In such cases, the notification module 264 (or another module within the wireless service provider server 114) may have earlier obtained the financial institution information associated with the electronic device 102 from the electronic device 102 (for example, by querying the electronic device 102 for the financial institution information, and receiving the financial institution information in response to the query).

The first wireless service provider server 114 then sends a notification of the roaming status of the electronic device 102 to the financial institution server 118 associated with the identified financial institution. That is, after obtaining the financial institution information that identifies the financial institution, the notification module 264 sends a notification to the financial institution server 118 associated with the identified financial institution. The notification informs the financial institution server 118 that the electronic device 102 for an end-user is roaming. The notification may specify a location associated with the roaming. For example, in cases where the electronic device 102 is internationally roaming, the notification module 264 may identify the country in which the electronic device 102 is internationally roaming, and include the identified country within the notification. Accordingly, the financial institution server 118 is informed that the end-user of the electronic device 102 is outside of the home country and in some cases, the visiting foreign country. The notification may be sent to the financial institution server 118 in a secure manner that allows the financial institution server 118 to authenticate the source of the notification. For example, various encryption techniques may be utilized.

In at least some example embodiments, the notification module 264 may communicate with the electronic device 102 to obtain authorization from the end-user prior to informing the financial institution server 118 of the roaming status of the electronic device 102. For example, in at least some example embodiments, the notification module 264 may send a request to the electronic device 102 for authorization to notify the financial institution server 118 of the roaming status of the electronic device 102. Then, after receiving from the electronic device 102 authorization to notify the financial institution server 118 (for example, the end-user may input an authorizing instruction via an input interface associated with the electronic device 102) of the roaming status of the electronic device 102, the notification is sent to the financial institution server 118.

Additionally, in at least some example embodiments, prior to sending the request to the electronic device 102, the notification module 264 may determine that subscription preferences associated with the electronic device 102 authorize the request to be sent, and the request is sent in response to determining that the subscription preferences authorize the request to be sent. The wireless service provider server 114 may store subscription preferences associated with the electronic device in the data area of the memory 250 (which may be arranged within data stores associated for each electronic device). In such cases, the notification module 264 (or another module within the wireless service provider server 114) may have earlier obtained the subscription preferences associated with the electronic device 102 from the electronic device 102 (for example, an end-user of the electronic device 102 may input subscription preferences via an input interface, that are received and stored by the wireless service provider server 114). Accordingly, the notification module 264 may retrieve and analyze the subscription preferences, and may determine that the subscription preferences authorize the request to be sent.

In at least some example embodiments, the notification module 264 may detect that the electronic device 102 is not roaming after detecting the roaming condition. For example, the electronic device 102 may return to the coverage area of the first wireless network 110, and upon connection of the electronic device 102 with the first wireless network 110, the notification module 264 may detect that the electronic device 102 is no longer roaming. In such example embodiments, the notification module 264, in response to detecting that electronic device 102 is not roaming, may send a notification to the financial institution server 118 that the electronic device 102 is not roaming. That is, the notification module 264 informs the financial institution server 118 that the electronic device 102 is no longer roaming. This information may also be used by the financial institution server 118 to identify fraudulent financial transactions. That is, after the electronic device 102 has returned home, transactions from POS terminals located in a region that is not associated with the home network may be declined.

In at least some example embodiments, other modules, such as the operating system 262 may perform some or all of the functions of the notification module 264. In at least some example embodiments, the notification module 264 may instead include a plurality of software modules rather than a single block as illustrated.

It will be appreciated that the first wireless service provider server 114 as illustrated in FIG. 2 is an example server. In at least some example embodiments, servers may be used which are of different configurations and/or functions.

Example Electronic Device

Figure 3:
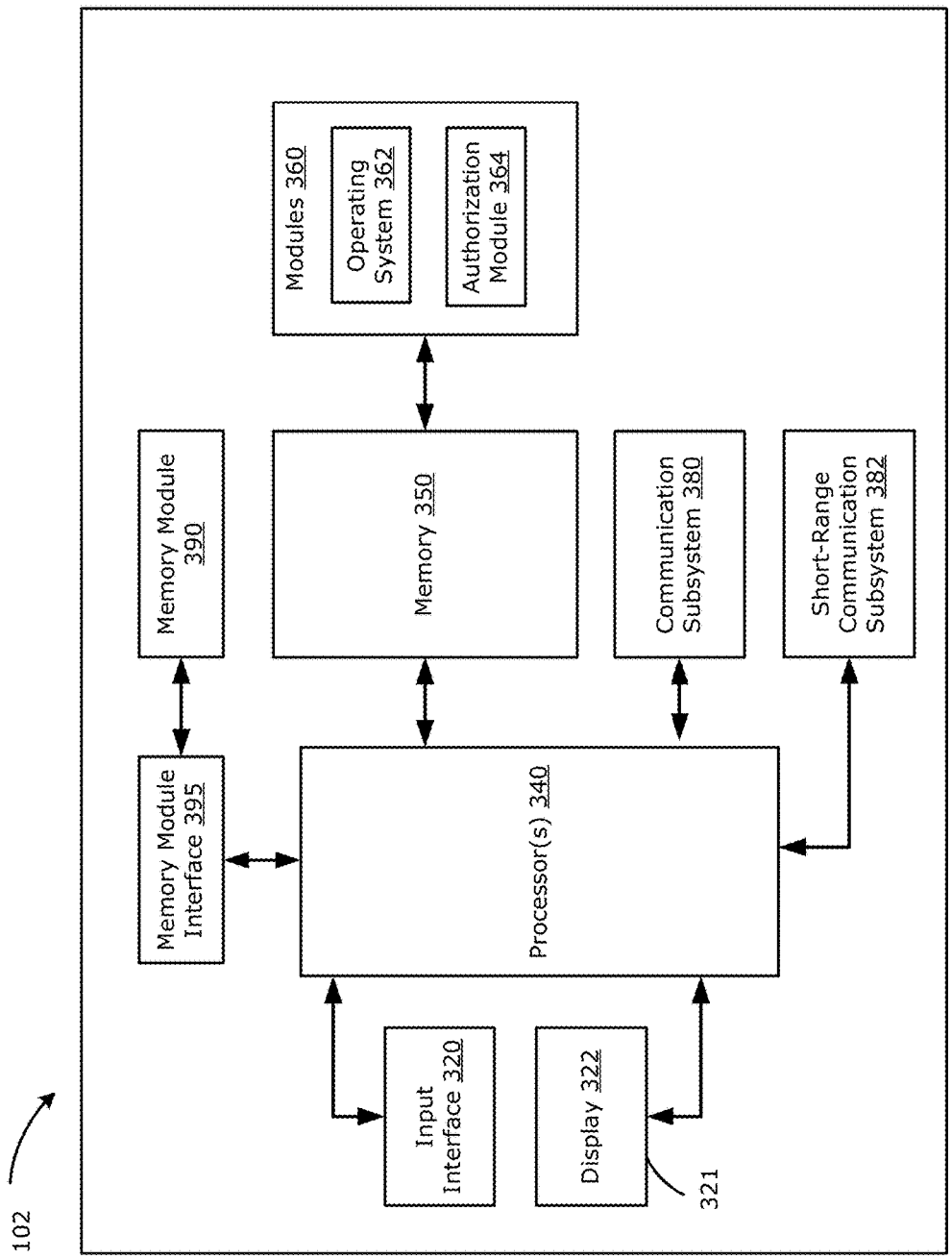
FIG. 3 shows a block diagram of an example electronic device in accordance with example embodiments of the present disclosure.

Reference is next made to FIG. 3 which illustrates an example electronic device 102 in block diagram form. In the illustrated example embodiments, the electronic device 102 is a mobile communication device (such as, a smartphone) capable of voice and data communications with other devices, systems and servers, for example, via the first wireless network 110, the second wireless network 112 and the network 120.

The electronic device 102 includes a controller which may include one or more processors 340 that control the overall operation of the electronic device 102. The processor 340 may be communicably coupled with device subsystems including one or more input interfaces 320 (such as a keyboard, control buttons, a microphone, a touchscreen display, a mouse, a trackpad, a microphone and/or other input interfaces), one or more output interfaces 321 (such as a display 322 and/or a speaker), memory 350 (which may include multiple memory components of various types such as flash memory, random access memory (RAM), read only memory (ROM), a hard disk drive (HDD), a solid state drive (SSD), or other types of memory), a communication subsystem 380 for communicating either wirelessly or non-wirelessly with other systems, servers and/or electronic devices, and a short-range communication subsystem 382 (to allow for near field communication (NFC) or Bluetooth). The processor 340 may be communicably coupled with other device subsystems not specifically described herein.

In at least some example embodiments, the electronic device 102 may also include one or more removable memory modules 390 and a memory module interface 395. The electronic device 102 may access the wireless networks via the memory module 390, which may include one or more physical universal integrated circuit cards (UICC), which may also be referred to as a subscriber identity module (SIM) card. The memory module 390 may be inserted in or connected to the memory module interface 395 of the electronic device 102.

The SIM card is an integrated circuit that includes a processor and memory, and may store unique identifiers identifying the end-user of the electronic device 102, security keys, a subscription service package provided by the wireless service provider that define the communication services of the electronic device 102 including roaming policy rates of usage, subscription preferences, wireless network information, etc. In at least some example embodiments, the SIM card may further store financial institution and financial instrument information (i.e. the SIM card may allow the electronic device to function as a "mobile wallet"). This financial information may be sent from the electronic device 102 to a POS terminal via the short-range communication subsystem 382 during a mobile payment transaction. The SIM cards are provided by wireless network service providers to manage wireless network communication services for the electronic device 102. In some cases, the electronic device 102 may include an embedded SIM card that is not removable.

The processor 340 may operate under stored program control and may execute software modules 360 stored on the memory 350. The software modules 360 may be comprised of, for example, operating system 362 software, and one or more additional modules such as an authorization module 364 to carry out specific functions of the electronic device 102.

The operating system 362 is software that manages the electronic device 102 components (such as the input interface 320, the display 322, the communication subsystem 380, etc.) and provides a platform for the software modules 360. The operating system 362 also acts as an intermediary between the electronic device 102 components and the software modules 360. For example, the operating system 362 may recognize data that is being input from an input device and route the inputted data to be executed by a software module 360. The operating system 362 may be Microsoft Windows OS™, iOS™, Linux™, UNIX™, Android™ or any other operating system 362 having the necessary capabilities for implementing the functions described herein.

The authorization module 364 is a module that may, in some embodiments, manages whether the first wireless service provider server 114 sends a notification of the roaming status of the electronic device 102 to the financial institution server 118. For example, in at least some example embodiments, when the electronic device 102 is roaming (i.e. it is associated with a roaming condition), the authorization module 364 receives a request from the first wireless service provider server 114 to authorize the first wireless provider server 114 to notify a financial institution server 118 associated with a financial institution of a roaming status of the electronic device 102. The financial institution is associated with the electronic device 102. In at least some example embodiments, the request may be included in a short message service (SMS) or multimedia messaging service (MMS) communication that is received by the authorization module 364. Additionally, in at least some example embodiments, the request may be sent together with a roaming condition message that advises the user of the roaming condition of the electronic device 102 (for example, the roaming condition message may indicate that a roaming policy rate may apply for usage of the electronic device 102 for voice and data communications). In response to receiving the request, the authorization module 364 presents a prompt (for example, via the display 322 of the electronic device 102) requesting confirmation to authorize the first wireless service provider server 114 to notify the roaming status of the electronic device 102 to the financial institution server 118. When confirmation is received (for example, the end-user may input a confirmation instruction via the input interface 320), the authorization module 364 sends the authorization to the wireless service provider server 114 to notify the financial institution server 118 of the roaming status of the electronic device 102. Accordingly, the authorization module 364 allows an end-user to control whether the first wireless service provider server 114 sends a notification of the roaming status of the electronic device 102 to the financial institution server 118.

In at least some example embodiments, other modules, such as the operating system 362 may perform some or all of the functions of the authorization module 364. In at least some example embodiments, the authorization module 364 may instead include a plurality of software modules rather than a single block as illustrated.

Notifying a Roaming Status of an Electronic Device

Figure 4:
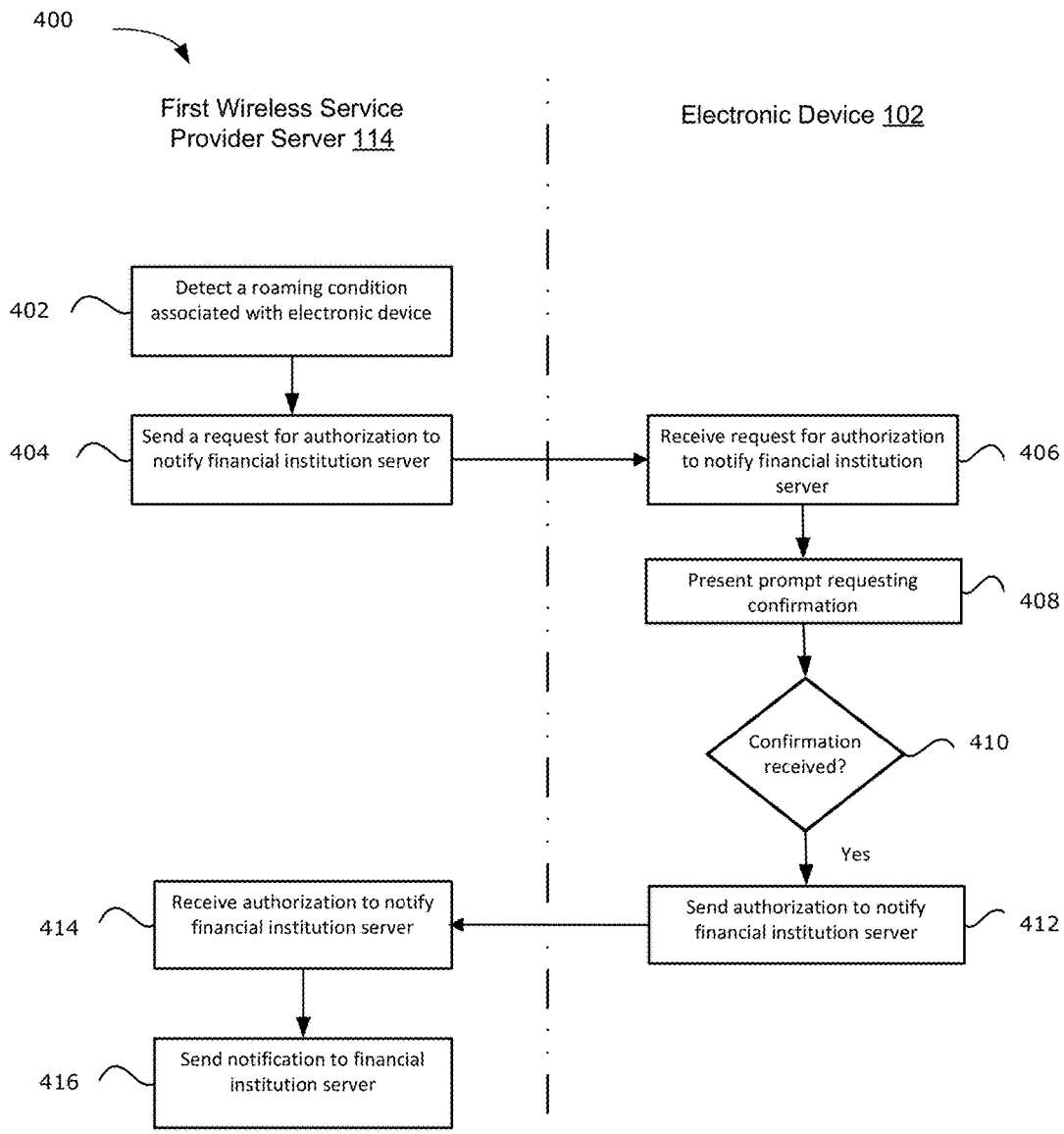
FIG. 4 shows a flowchart of an example method of notifying a roaming status of an electronic device in accordance with example embodiment of the present disclosure.

Referring now to FIG. 4, an example method 400 of notifying a roaming status of an electronic device 102 is illustrated in flowchart form. Portions of the method 400 may be implemented by the first wireless service provider server 114 and portions of the method 400 may be implemented by the electronic device 102. One or more modules on the first wireless service provider server 114, such as the notification module 264, may perform portions of the method 400 and one or more modules on the electronic device 102, such as the authorization module 364, may perform portions of the method 400. More particularly, the notification module 264 may contain computer readable instructions causing the processor 240 associated with the wireless service provider server 114 to perform the functions that are indicated as being performed by the first wireless service provider server 114. Similarly, the authorization module 364 may contain computer readable instructions causing the processor 340 associated with the electronic device 102 to perform the electronic device 102 specific operations. It will be appreciated that other modules on the first wireless service provider server 114 or the electronic device 102 may perform some or all of the device-specific operations of method 400.

At 402, the first wireless service provider server 114 may detect a roaming condition associated with the electronic device 102. The first wireless service provider server 114 is associated with the first wireless service provider that provides a first wireless network 110 (FIG. 1). The electronic device 102 is associated with a subscription service package of the first wireless service provider. That is, an end-user of the electronic device 102 is a subscriber to the first wireless service provider by purchasing a subscription service package from the first wireless service provider. As mentioned above, the subscription service package may define the terms of usage of communication services on the wireless networks which may include roaming capabilities for the electronic device 102. In such example embodiments, the first wireless network 110 may be the home network of the electronic device 102.

The roaming condition may be based one or more specific types of roaming—for example, regional roaming, national roaming and/or international roaming. For example, in at least some example embodiments, the roaming condition may be limited to international roaming. Accordingly, the wireless service provider server 114 may detect the roaming condition only when detecting that the electronic device 102 is internationally roaming. For example, the second wireless network 112 (FIG. 1) provided by the second wireless service provider may be a visiting network for the electronic device 102. That is, the electronic device 102 leaves the first wireless network 110 (i.e. its home network) and enters the second wireless network 112 (i.e. a visiting network). The second wireless service provider may be a foreign wireless service provider, and the second wireless network 112 may be located in a different country than the first wireless network. For example, an end-user of the electronic device 102 may travel from Toronto to New York, and accordingly, the electronic device 102 switches from being connected to the home network in Toronto provided, for example, by Rogers Wireless™, to a visiting network in New York provided, for example, by AT&T Mobility™.

In other example embodiments, the roaming condition may be detected based on national roaming. For example, when the electronic device moves to an area in their home country that is not serviced by the wireless service provider to which the electronic device subscribes but which is serviced by another wireless service provider, then the roaming condition may be detected.

In yet other example embodiments, the roaming condition may be detected based on regional roaming. For example, when the electronic device moves to an area which is serviced by the wireless service provider associated with that device but which is outside of a home-zone associated with the subscription service for that device (e.g. the home-zone may be a region where favorable billing rates apply and the area to which the device moves may be an area where less-favorable billing rates apply) then the roaming condition may be detected.

Thus, the roaming condition may be detected based on different criteria in different embodiments. In at least some such embodiments, at 402, the roaming condition is detected at the first wireless service provider server 114 based on information received from the second wireless service provider server 114. For example, in at least some example embodiments, the first wireless service provider server 114 may detect the roaming condition when the electronic device 102 enters the second wireless network 112, and the second wireless service provider server 116 communicates with the first wireless service provider server 114 to obtain subscription service information and attempt to allow the electronic device 102 to roam within the second wireless network 112. Accordingly, communications from the second wireless service provider server 116 to the first wireless service provider server 114 about the visiting electronic device 102 may trigger detection of the roaming condition associated with the electronic device 102. Accordingly, the roaming detection which may be used to allow the electronic device 102 to access other wireless networks may be used to also assist the identification of fraudulent financial transactions.

In at least some embodiments, at 402 the first wireless service provider server 114 may detect a location of the roaming. For example, in at least some example embodiments, where the first wireless service provider server 114 detects that the electronic device 102 is internationally roaming (for example, the first wireless service provider server 114 may receive communication from a foreign wireless service provider about the visiting electronic device 102 on its network), the detection performed at 402 may include identifying a country in which the electronic device 102 is internationally roaming. For example, the first wireless service provider server 114 may identify the country associated with the second wireless service provider that provides the second wireless network 112. This identification may be performed when the second wireless service provider server 116 communicates with the first wireless service provider server 114 to attempt to allow roaming of the electronic device 102 on the second network. It will be appreciated that in at least some example embodiments, the first wireless service provider server 114 may further identify the village, town, city and/or region within the country in which the electronic device 102 is roaming.

In at least some example embodiments, the first wireless service provider server 114, in response to detecting the roaming condition, may apply a roaming policy rate defined by the subscription service package for usage of the electronic device 102. That is, the subscription service package purchased by the end-user may define the roaming costs for using the electronic device 102 in the second wireless network 112, and these roaming costs are applied when the electronic device 102 is utilized by the end-user to perform voice and data communications on the second wireless network 112.

In some embodiments, at 404, the first wireless service provider server 114 may send a request to the electronic device 102 for authorization to notify the financial institution server 118 of the roaming status of the electronic device 102. In at least some example embodiments, the request is included in a short message service (SMS) communication. In at least some example embodiments, the request is sent to the electronic device 102 with a roaming condition message. The roaming condition message advises of the roaming condition associated with the electronic device 102, and may be referred to as a welcome message. For example, if the request is included in a welcome message that is in an SMS communication, the SMS communication may state, "Welcome to Country X. Please be advised that roaming policy rates as defined by your subscription service package apply for voice and data communications. Also, do you want to notify your Bank of your presence in country X?" Such an SMS communication which includes the welcome message and the request is sent to the electronic device 102 from the first wireless service provider server 114.

In at least some example embodiments, the first wireless service provider server 114, prior to sending the request to the electronic device 102, may determine that subscription preferences associated with the electronic device 102 authorize the request to be sent. The subscription preferences define user preferences associated with subscribed voice and data communication services for the electronic device 102. For example, subscription preferences may define whether an electronic device 102 is allowed to roam, whether data services are enabled when roaming, when to deliver messages to the electronic device 102, etc. These subscription preferences may be manipulated, for example by instructions input by the end-user of the electronic device 102. Accordingly, in at least some example embodiments, the subscription preferences may include whether to authorize the request to be sent. The end-user may manipulate the subscription preferences to authorize the request to be sent. These subscription preferences associated with the electronic device 102 may be stored on the first wireless service provider server 114 (for example, in the memory 250) and/or on the electronic device 102 (for example, on the SIM card). In such example embodiments, the first wireless service provider server 114 may retrieve and analyze the subscription preferences, and may determine that the subscription preferences authorize the request to be sent (for example, the end-user may have input instructions to set such a preference). In response to determining that the subscription preferences authorize the request to be sent, the first wireless service provider server 114 sends the request to the electronic device 102 (i.e. 404 is performed).

At 406, the electronic device 102 receives the request from the first wireless service provider server 114 for authorization to notify the financial institution server 118 of the roaming status of the electronic device 102.

At 408, in response to receiving the request, the electronic device 102 present a prompt via the display 322 requesting confirmation to authorize the first wireless service provider server 114 to notify the financial institution server 118 of the roaming status of the electronic device 102. For example, the electronic device 102 may display the SMS communication that includes the welcome message and the request, along with a prompt requesting confirmation. For example, the electronic device 102 may display the following communication that includes the prompt requesting confirmation, "Welcome to Country X. Please be advised that roaming policy rates as defined by your subscription service package apply for voice and data communications. Also, do you want to notify your Bank of your presence in country X? Please select Yes or No".

When confirmation is received at 410, for example by the end-user inputting a confirmation instruction via the input interface 320 (for example, the end-user may select the "Yes" option by inputting a select instruction), the electronic device 102, at 412, sends authorization to the first wireless service provider server 114 to notify the financial institution server 118 of the roaming status of the electronic device 102.

At 414, the first wireless service provider server 114 receives the authorization from the electronic device 102.

At 416, after detecting the roaming condition and in response to receiving the authorization, the first wireless service provider server 114 retrieves financial institution information that identifies one or more financial institutions associated with the electronic device 102, and sends a notification to one or more financial institution servers 118 associated with the identified financial institution(s). For example, the financial institution information associated with the electronic device 102 may be stored on the first wireless service provider server 114 (for example, in the data area 270 of the memory 250). The first wireless service provider server 114 may retrieve the financial institution information for the electronic device 102 that is detected to have a roaming condition. The retrieved financial institution information is analyzed to identify the financial institution (s). More particularly, one or more financial institution server(s) 118 associated with the electronic device 102 and/or its user are identified. The first wireless service provider server 114 then sends a notification of the roaming status of the electronic device 102 to the financial institution server(s) 118. Accordingly, the financial institution server(s) 118 are informed that the electronic device 102 is roaming, and the end-user is outside of the home region. The financial institution server(s) 118 may update information associated with the end-user which may include security-related information, for example, to allow the end-user to use financial instruments issued by the financial institution within the visited region.

In at least some example embodiments, at 416, the notification sent to the financial institution server(s) 118 may specify a location associated with the roaming condition. For example, where the electronic device 102 is internationally roaming, as mentioned above, the detection at 402 may further include identifying a country in which the electronic device 102 is internationally roaming. In such example embodiments, the notification sent at 416 may further identify the country in which the electronic device 102 is internationally roaming. Accordingly, the financial institution server 118 is also informed of the country that the electronic device 102 is roaming, and the end-user is in the identified country. Similarly, the financial institution server 118 may update information (which may include security-related information) associated with the end-user, for example, to allow the end-user to use financial instruments issued by the financial institution within the identified country. Accordingly, the financial institution server 118 is configured to utilize the notification of the roaming status that is sent to the financial institution server 118 at 416 when determining whether a transaction at a POS terminal will be approved or declined.

As mentioned above, in at least some example embodiments, the electronic device 102 is associated with one or more of the financial institutions for mobile payment via a short-range communication subsystem (such as, NFC) of the electronic device 102. In such example embodiments, the financial institution server(s) 118 may manage mobile payments from the electronic device 102. Accordingly, by being notified of the roaming condition of the electronic device 102, the financial institution server(s) 118 may allow mobile payments from the electronic device 102 with POS terminals at the visited region to proceed.

In the example embodiments illustrated, the first wireless service provider server 114 requests authorization from the electronic device 102 prior to notifying the financial institution of the roaming condition, and the notification is sent only after receiving authorization. However, as mentioned above, the first wireless service provider server 114 may not require permission from the electronic device 102, and may automatically send the notification after detecting the roaming condition. That is, the electronic device 102, after detecting a roaming condition associated with the electronic device 102, retrieves financial institution information that identifies one or more financial institution(s) associated with the electronic device 102, and then sends the notification to the financial institution server(s) 118 associated with the identified financial institution(s) (i.e. 402 is performed and then 416 is performed).

In at least some example embodiments, the first wireless service provider server 114, after detecting a roaming condition and prior to sending the notification, may determine that subscription preferences associated with the electronic device 102 authorize notifying the financial institution server(s) 118 of the roaming status of the electronic device 102. As mentioned above, the subscription preferences define user preferences associated with subscribed voice and data communication services for the electronic device 102. The subscription preferences may include whether to authorize the notification to be sent. These subscription preferences may be stored in the first wireless service provider server 114 (for example, in the memory 250) and/or on the electronic device 102 (for example, on the UICC or SIM card). Accordingly, in such example embodiments, the first wireless service provider server 114 may retrieve and analyze the subscription preferences, and may determine that the subscription preferences authorize notifying the financial institution server 118 of the roaming status of the electronic device 102 (for example, the end-user may have input instructions to set such a preference). In response to determining that the subscription preferences authorize notifying the financial institution server(s) 118 of the roaming status of the electronic device 102, the first wireless service provider server 114 sends the notification of the roaming status of the electronic device 102 to the financial institution server(s) 118 (i.e. 416 is performed).

In at least some example embodiments, the first wireless service provider server 114 may, after detecting the roaming condition associated with the electronic device 102, detect that the electronic device 102 is not roaming. For example, the electronic device 102 may return to the coverage of the first wireless network 110 provided by the first wireless service provider. Accordingly, the electronic device 102 may connect to the first wireless network 110, and the first wireless service provider server 114 may detect that the electronic device 102 is no longer roaming. In such example embodiments, the first wireless service provider server 114 in response to detecting that the electronic device 102 is not roaming, may send a notification to the financial institution server(s) 118 that the electronic device is not roaming. Accordingly, the financial institution server(s) 118 are informed that the electronic device 102 is no longer roaming, and the end-user has returned to the home region. The financial institution server(s) 118 may update information associated with the end-user which may include security-related information, for example, to prevent the use of the end-user's financial instruments issued by the financial institution(s) outside of the home region.

It will be appreciated that the first wireless service provider server 114 may detect a roaming condition even when the electronic device 102 moves from one roaming network to another roaming network (for example, the end-user may travel from one visiting country to another visiting country). In such example embodiments, for example, the first wireless service provider server 114 may detect a roaming condition when the electronic device 102 is roaming within a wireless network of a visiting country A, and send a notification to the financial institution server 118 of the roaming status of the electronic device 102, with the notification identifying country A. The first wireless service provider server 114 may then detect a roaming condition when the electronic device 102 is moved to roam within a wireless network of a visiting country B (that is, the end-user may travel from visiting country A to country B), and accordingly, send a notification to the financial institution server(s) 118 of the roaming status of the electronic device 102, with the notification identifying country B. Accordingly, the financial institution server(s) 118 are updated of the roaming status of the electronic device 102.

While the present disclosure is primarily described in terms of methods, a person of ordinary skill in the art will understand that the present disclosure is also directed to various apparatus, such as a server and/or an electronic device, including components for performing at least some of the aspects and features of the described methods, be it by way of hardware components, software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, and articles of manufacture also come within the scope of the present disclosure.

While the methods have been described as occurring in a particular order, it will be appreciated by persons skilled in the art that some of the steps may be performed in a different order provided that the result of the changed order of any given step will not prevent or impair the occurrence of subsequent steps. Furthermore, some of the steps described above may be combined in other embodiments, and some of the steps described above may be separated into a number of sub-steps in other embodiments.

The various embodiments presented above are merely examples. Variations of the embodiments described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

What is claimed is:

1. A computer-implemented method comprising:
receiving, by a wireless service provider server associated with a wireless service provider, an indication that an electronic device associated with a subscription service package of the wireless service provider has connected to a network;
identifying, by the wireless service provider server based on the indication, a roaming condition associated with the electronic device by determining that the network to which the electronic device has connected is not a home network of the electronic device;
determining, by the wireless service provider server, that subscription preferences associated with the electronic device authorize a request for authorization to notify a financial institution of the roaming status of the electronic device to be sent to the electronic device;

in response to determining that the subscription preferences authorize the request to be sent, sending, by the wireless service provider server to the electronic device via the network, the request for authorization, wherein the electronic device is configured to generate a prompt requesting confirmation to authorize the wireless service provider to notify the financial institution as to the roaming status of the electronic device in response to receiving the request;

receiving, by the wireless service provider server from the electronic device via the network, confirmation of authorization to notify the financial institution of the roaming status of the electronic device; and in response to receiving the confirmation of authorization to notify the financial institution:
  retrieving, by the wireless service provider server, financial institution information associated with the electronic device, the financial institution information identifying the financial institution; and
  sending, by the wireless service provider server to a financial institution server associated with the identified financial institution, a notification of the roaming status of the electronic device, wherein the financial institution server is configured to:
    identify, based on the notification of the roaming status of the electronic device, a region where the electronic device is roaming;
    identify a location associated with a point of sale terminal originating a financial transaction; and
    determine whether to allow the financial transaction based on whether the location associated with the point of sale terminal is within or near the region where the electronic device is roaming.

2. The method of claim 1, wherein the request is included in a short message service or multimedia messaging service (MMS) communication.

3. The method of claim 1, wherein the request is sent to the electronic device together with a roaming condition message, the roaming condition message advising of the roaming condition.

4. The method of claim 1, further comprising:
  determining that subscription preferences associated with the electronic device authorize notifying the financial institution server of the roaming status of the electronic device,
  and wherein the notification is sent to the financial institution server in response to determining that subscription preferences associated with the electronic device authorize notifying the financial institution server of the roaming status of the electronic device.

5. The method of claim 1, further comprising:
  detecting that the electronic device is not roaming after detecting the roaming condition; and
  in response to detecting that the electronic device is not roaming, sending a notification to the financial institution server that the electronic device is not roaming.

6. The method of claim 1, wherein identifying the roaming condition includes identifying a country in which the electronic device is internationally roaming, and wherein the notification of the roaming status of the electronic device sent to the financial institution server identifies the country in which the electronic device is internationally roaming.

7. The method of claim 1, further comprising:
  in response to detecting the roaming condition, applying a roaming policy rate defined by the subscription service package for usage of the electronic device.

8. The method of claim 1, wherein the electronic device is associated with the financial institution for mobile payment via a communication subsystem of the electronic device.

9. A wireless service provider server associated with a wireless service provider, the wireless service provider providing a subscription service package to an electronic device, the wireless service provider server comprising:
  a communication subsystem;
  a memory; and
  a processor coupled to the communication subsystem and the memory, the processor configured to:
    receive an indication that the electronic device has connected to a network;
    identify, based on the indication, a roaming condition associated with the electronic device by determining that the network to which the electronic device has connected is not a home network of the electronic device;
    determine that subscription preferences associated with the electronic device authorize a request for authorization to notify a financial institution of the roaming status of the electronic device to be sent to the electronic device;
    in response to determining that the subscription preferences authorize the request to be sent, send the request to the electronic device via the network, wherein the electronic device is configured to generate a prompt requesting confirmation to authorize the wireless service provider to notify the roaming status of the electronic device to the financial institution in response to receiving the request;
    receive, from the electronic device via the network, confirmation of authorization to notify the financial institution of the roaming status of the electronic device; and
    in response to receiving the confirmation of authorization to notify the financial institution:
      retrieve financial institution information associated with the electronic device, the financial institution information identifying the financial institution; and
      send a notification of the roaming status of the electronic device to a financial institution server associated with the identified financial institution, wherein the financial institution server is configured to:
        identify, based on the notification of the roaming status of the electronic device, a region where the electronic device is roaming;
        identify a location associated with a point of sale terminal originating a financial transaction; and
        determine whether to allow the financial transaction based on whether the location associated with the point of sale terminal is within or near the region where the electronic device is roaming.

10. The wireless service provider server of claim 9, wherein the request is included in a short message service communication.

11. The wireless service provider server of claim 9, wherein the request is sent to the electronic device together with a roaming condition message, the roaming condition message advising of the roaming condition.

12. The wireless service provider server of claim 9, wherein the processor is further configured to:

determine that subscription preferences associated with the electronic device authorize notifying the financial institution server of the roaming status of the electronic device, and wherein the notification is sent to the financial institution server in response to determining that subscription preferences associated with the electronic device authorize notifying the financial institution server of the roaming status of the electronic device.

13. The wireless service provider server of claim 9, wherein the processor is further configured to:
detect that the electronic device is not roaming after detecting the roaming condition; and
in response to detecting that the electronic device is not roaming, send a notification to the financial institution server that the electronic device is not roaming.

14. The wireless service provider server of claim 9, wherein identifying the roaming condition includes identifying a country in which the electronic device is internationally roaming, and wherein the notification of the roaming status of the electronic device sent to the financial institution server identifies the country in which the electronic device is internationally roaming.

15. A computer-implemented method comprising:
receiving, by an electronic device associated with a subscription package of a wireless service provider from a wireless service provider server associated with the wireless service provider, a request to authorize notifying a financial institution of a financial institution associated with the electronic device of the roaming status of the electronic device as detected by the wireless service provider server;
in response to receiving the request:
presenting, by the electronic device, a prompt requesting confirmation to authorize the wireless service provider to send a notification of the roaming status of the electronic device to the financial institution; and
receiving, via an input interface associated with the electronic device, a confirmation to authorize the wireless service provider to send a notification of the roaming status of the electronic device to the financial institution; and
sending authorization to the wireless service provider server to notify a server of the financial institution of the roaming status of the electronic device, wherein the server of the financial institution is configured to:
identify, based on a notification of the roaming status of the electronic device, a region where the electronic device is roaming;
identify a location associated with a point of sale terminal originating a financial transaction; and
determine whether to allow the financial transaction based on whether the location associated with the point of sale terminal is within or near the region where the electronic device is roaming.

16. The method of claim 6, wherein the region where the electronic device is roaming is the country in which the electronic device is internationally roaming as identified in the notification of the roaming status of the electronic device and wherein the financial institution server is configured to determine whether to allow the financial transaction based on whether the location associated with the point of sale terminal is within the country in which the electronic device is internationally roaming.

17. The wireless service provider server of claim 14, wherein the region where the electronic device is roaming is the country in which the electronic device is internationally roaming as identified in the notification of the roaming status of the electronic device and wherein the financial institution server is configured to determine whether to allow the financial transaction based on whether the location associated with the point of sale terminal is within the country in which the electronic device is internationally roaming.

18. The method of claim 15 wherein the electronic device is internationally roaming, and wherein the notification of the roaming status of the electronic device identifies a country in which the electronic device is internationally roaming.

19. The method of claim 18, wherein the region where the electronic device is roaming is the country in which the electronic device is internationally roaming as identified in the notification of the roaming status of the electronic device and wherein the server of the financial institution is configured to determine whether to allow the financial transaction based on whether the location associated with the point of sale terminal is within the country in which the electronic device is internationally roaming.

* * * * *